United States Patent [19]
Zakharzhevsky

[11] 3,896,846
[45] July 29, 1975

[54] DIRECT-FLOW VALVE

[76] Inventor: Georgy Leonidovich Zakharzhevsky, ulitsa Chkalova 125, kv. 14, Sumy, U.S.S.R.

[22] Filed: May 14, 1973

[21] Appl. No.: 360,169

[30] Foreign Application Priority Data
Dec. 10, 1969 U.S.S.R............................ 1383604

[52] U.S. Cl........................... 137/512.1; 137/516.11
[51] Int. Cl............................................. F16k 15/16
[58] Field of Search........ 137/512.1, 512.15, 516.11

[56] References Cited
UNITED STATES PATENTS
2,408,056  9/1946  Farmer .......................... 137/512.15
3,438,390  4/1969  Brown............................. 137/512.1

FOREIGN PATENTS OR APPLICATIONS
512,632  9/1939  United Kingdom.............. 137/512.1
1,227,939  4/1971  United Kingdom............. 137/512.1

Primary Examiner—Robert G. Nilson
Attorney, Agent, or Firm—Waters, Schwartz & Nissen

[57] ABSTRACT

A direct-flow valve comprises an integrally formed body in which there is a system of slots on the pressure side narrowing toward the suction side and having bottom walls, one of the sides of each slot functioning as the valve seat. On the delivery side the body is provided with rows of through openings extending up to the walls of said slots which function as the seats. Resilient plates are fixed to the bottom portions of the slots and are in contact with said seats to separate the slots from said openings. These plates are the valve members of the valve and during the suction period they are deflected so as to abut against the opposite slot walls which limit the bending of the resilient plates.

1 Claim, 7 Drawing Figures

DIRECT-FLOW VALVE

The present invention relates to the compressor manufacturing, and more specifically to the direct-flow valves to be used for controlling the suction and delivery steps.

Prior art direct-flow valve comprises a set of shaped plates and resilient plates clamped inbetween the shaped plates, the plates being held in this position by means of screws in the rectangular valve and by means of conical rings in the circular valve.

The resilient plates are clamped between the shaped plates along the U-shaped or E-shaped outline, and the intermediate portions thereof are separated from the lateral clamped edges and respectively from the intermediate clamped portion with the E-shaped outline by means of slots, whereby these intermediate portions of the resilient plates can be deflected moving apart from the shaped plates or coming in contact therewith.

The shaped plates comprise a plate having on one side thereof a plurality of grooves parallel therebetween, which are separated by ribs and reduced to zero, and on the other side a recess corresponding to a required amount of deflection of the resilient plate during the operation of the valve.

When assembled the shaped plates form a system of through passages bridged by the resilient plates, those sides of the shaped plates, which have the grooves, functioning as the valve seat, the resilient plate functioning as the valve member and that side of the shaped plate, which is provided with the recess, being the member which limits the bending of the resilient plate.

The direct-flow valve is mounted in a compressor in such a manner that the resilient plates extend in the planes substantially parallel with the direction of the gas flow and ensure considerably greater throughput cross section area as compared to the valves of other known constructions, while providing for direct flow of gas through the valve.

The disadvantage of the above-described direct-flow valve consists in rather short service life of the resilient plates due to their construction, and namely in frequent fractures of the resilient plates at the stamped slots resulting in failures of the valve.

Furthermore, during the manufacturing of the resilient plates the difficulties arise due to the fact that the valve comprises a large number of the resilient plates of different size and shape, and a large number of dies are required, the durability of the dies being extremely low due to the presence of narrow slots of a width of about 2 mm in the pieces being stamped. Subsequent machining of the resilient plates in the slot zones includes the deburring and the removal of cold-worked layer using special equipment, which is labour-consuming and complicated.

For manufacturing the shaped plates for a valve of one type several sizes of press moulds are required, and hence, several injection moulding machines.

The assembly of the valve represents a complicated technological process, since it involves a large number of parts being assembled and their machining during the assembly, which requires purpose-made assembly equipment.

The construction of the prior art direct-flow valve does not ensure adequate tightness and rigidity at the fastening points of the resilient plates due to the fact that during the assembly a large number of the resilient plates are clamped between the shaped plates having insufficient rigidity. The conical rings clamping the resilient plates and the shaped plates together cannot ensure adequate tightness between the valve parts being clamped.

All the above-mentioned disadvantages result in gas loss and reduced output of the compressor incorporating such a valve.

It is an object of the invention to provide a direct-flow valve in which the resilient plates have the simplest shape so as to facilitate the manufacturing of the valve and to increase its durability.

Another object of the invention consists in the provision of a direct-flow valve having elevated rigidity of the body and ensuring tight fit of the valve in the compressor incorporating the valve.

Still another object of the invention is to provide a direct-flow valve which permits to replace the resilient plates during the repair without using purpose-made equipment.

The above objects are accomplished by that in a direct-flow valve comprising a body having a system of through passages made therein and bridged by resilient plates fixed to the body and functioning as the valve members, according to the invention the valve body is made integral, and said system of through passages comprises a system of slots made on the side of the body narrowing toward the suction side and having bottom walls, and rows of through openings made in the body on the suction side, said openings extending at an acute angle with respect to and adjacent the walls of said narrowing slots, which function as the valve seats, and the resilient plates are fixed with their edges to the bottom portions of said slots so as to abut against the slot bottom walls and in such a manner that said plates are in contact with the slot walls functioning as the seats to separate the cavities of the slots and through openings respectively, the opposite walls of the slots functioning as the members limiting the bending of the resilient plates upon their deflection thereof during the suction period.

In this direct-flow valve the resilient plates are of the simplest shape, which makes them more easy in the manufacture and more durable.

The valve according to the invention permits to increase the equivalent cross section area of the valve as compared to the prior art direct-flow valve by about 25% and to reduce the valve dead space by about 40%. Labour consumption in the manufacture of this valve is by 8–10 times lower as compared to that of the prior art valve. In manufacturing the valve according to the invention metal consumption is reduced by about twice. Integral design of the valve body ensures sufficient rigidity thereof.

The invention will now be described in detail with reference to the specific embodiment thereof illustrated in the accompanying drawings, in which.

Figure 1:
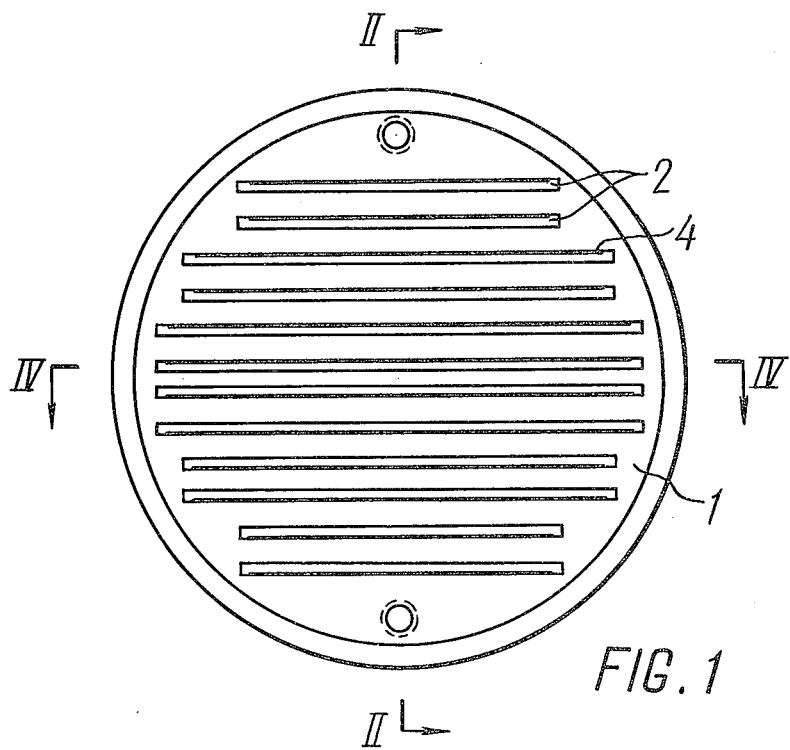
FIG. 1 shows a view of the direct-flow valve according to the invention taken from the delivery side.
Figure 2:
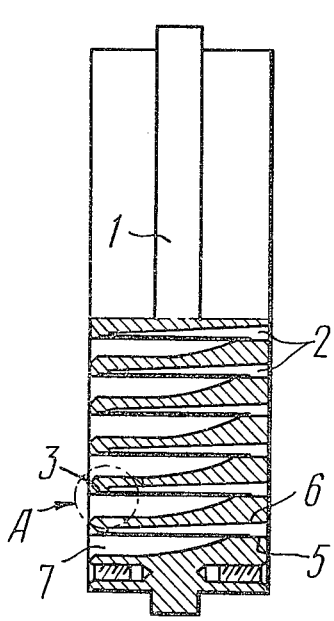
FIG. 2 is a side elevation of the direct-flow valve according to the invention partly in section along the line II—II in FIG. 1.

A direct-flow valve comprises a body 1 (FIG. 1) which is made integral, having on the delivery side slots 2 (FIGS. 1, 2). The slots 2 are made narrowing toward the suction side of the valve and are provided with bottom walls 3 (FIG. 3).

Figure 4:
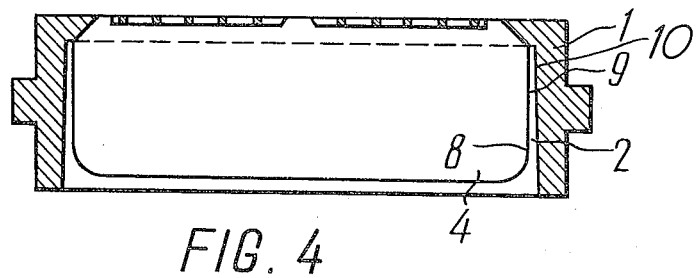
FIG. 4 is a sectional view taken along the line IV—IV in FIG. 1.
Figure 3:
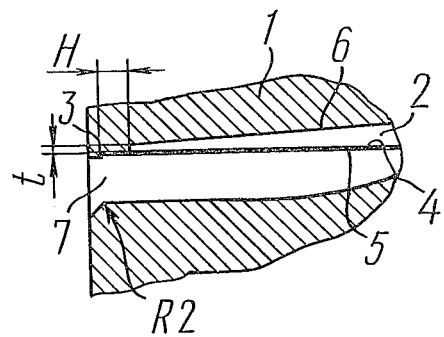
FIG. 3 is an enlarged detail A in FIG. 2.

Mounted in the valve slots 2 are resilient plates 4 (FIGS. 3, 4) which are the valve members of the valve and abut against the bottom walls 3 (FIG. 3).

On the suction side the bottom wall 3 covers the end face of the resilient plate 4, thereby ensuring a tight fit and fastening of the resilient plate 2 during the delivery period, as well as enables the sealing of the valve.

A wall 5 of the slot 2 in contact with the resilient plate 4 functions as the valve seat, while the opposite wall 6 is the member limiting the bending of the resilient plate 4, and the width of the slot 2 on the delivery side determines the amount of the free movement of the resilient plate 4 upon its deflection during the suction period. On the opposite side the slot 2 has along the length H a width t corresponding to the thickness of the resilient plate 4 and ensuring the fastening of the end face edges of the resilient plate 4 along the length H.

Figure 6:
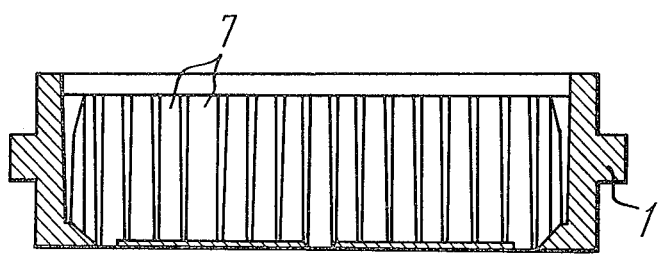
FIG. 6 is a sectional view taken along the line VI—VI in FIG. 5.
Figure 7:
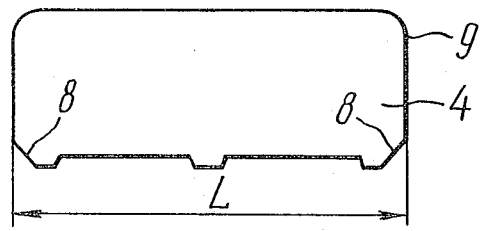
FIG. 7 shows a resilient plate of the direct-flow valve according to the invention.
Figure 5:
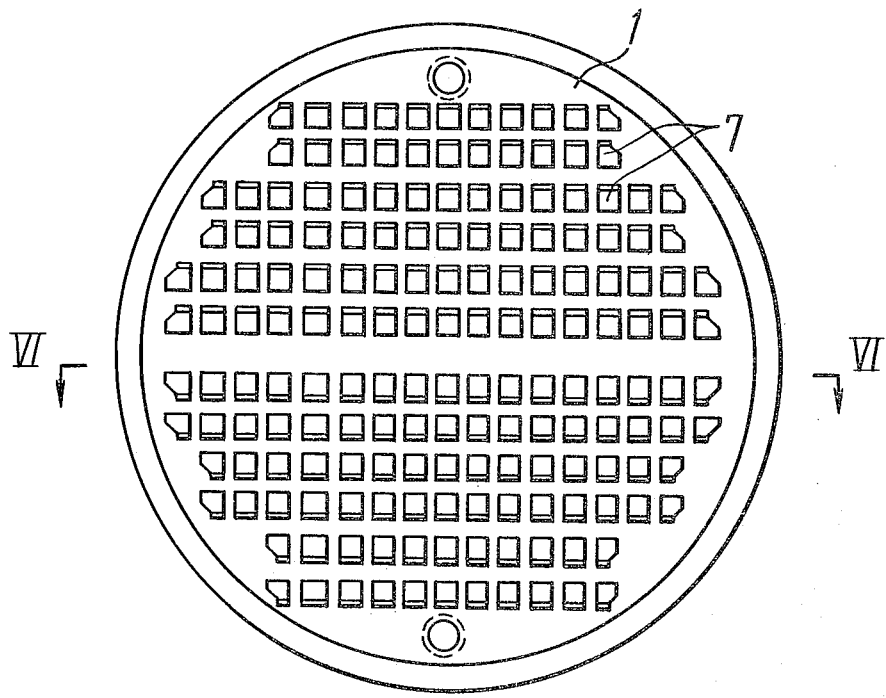
FIG. 5 is a view of the direct-flow valve according to the invention taken from the suction side.

On the suction side the valve is provided with a rout of through openings 7 (FIGS. 5, 6) extending at an acute angle with respect to and adjacent the walls 5 (FIG. 2) of the slots 2 functioning as the valve seats, and separated from the slots 2 by means of the resilient plates 4. The resilient plates 4 may be made with bevels 8 (FIG. 7) functioning as guide means during the fitting of the resilient plate 4 into the slot 2 and facilitating the replacement of the resilient plates 4 during the repair of the valve.

The length L of the resilient plate 4 should be such as to provide a space between its lateral edge 9 and a side wall 10 (FIG. 4) of the slot 2 ensuring the deflection of the unfastened portion of the resilient plate 4.

The direct-flow valve according to the invention functions as follows:

Assuming that the direct-flow valve is mounted in a respective seat of a compressor (not shown), during the suction stroke of the compressor piston gas will flow through the openings 7 (FIG. 2) to move around the resilient plates 4 until they abut against the walls 6 of the alots 2.

After the suction has been completed, the resilient plates 4 return into the initial position under the action of proper elastic forces, in which they will rest against the walls 5 of the slots 2, thus separating the slots 2 from the through openings 7 and defining an obstacle to the reverse flow of gas.

The direct-flow valve is preferably made by the metal injection moulding, whereby accurate valve dimensions are obtained, and therefore, its tight fit is ensured.

What is claimed is:

1. A direct-flow valve comprising: an integrally formed body; a system of slots made in said body on the delivery side narrowing toward the suction side and having bottom walls, one of the walls of said slots functioning as valve seats; rows of through openings made in said body on the suction side, said openings extending adjacent said walls of said narrowing slots, which function as the valve seats, flat resilient plates each having one of their edges fastened to the bottom portions of said slots so as to abut against said bottom walls of the slots so as to bias said plates into contact with said valve seats, said plates functioning as the valve members for respectively separating the cavities formed by said slots and said openings, said plates being deflected during the suction period from contact with said slot walls which function as the valve seats, and abutting against the opposite walls of said slots which function as members limiting the bending of said resilient plates.

* * * * *